United States Patent [19]

Kerr et al.

[11] 4,260,645
[45] Apr. 7, 1981

[54] LATENT FINGERPRINT DETECTION

[75] Inventors: F. Michael Kerr, Ottawa; Alan D. Westland, Chelsea, both of Canada

[73] Assignee: Canadian Patents and Development Limited, Ottawa, Canada

[21] Appl. No.: 508

[22] Filed: Jan. 2, 1979

[51] Int. Cl.$^3$ .......................... B41M 5/00; C09K 3/30; C09K 3/00; G01N 33/16
[52] U.S. Cl. ............................................ 427/1; 106/19; 106/21; 118/31.5; 252/182; 252/408; 422/61
[58] Field of Search ..................... 106/19, 21; 252/182, 252/408; 422/61; 118/31.5; 427/1

[56] References Cited

U.S. PATENT DOCUMENTS

| | | | |
|---|---|---|---|
| 2,235,632 | 3/1941 | Heinecke | 106/21 |
| 3,075,852 | 1/1963 | Bonora | 118/31.5 |
| 3,148,277 | 9/1964 | Lewanda | 118/31.5 |
| 4,182,261 | 1/1980 | Smith et al. | 106/21 |

FOREIGN PATENT DOCUMENTS

| | | | |
|---|---|---|---|
| 1428025 | 3/1976 | United Kingdom | 118/31.5 |
| 1497791 | 1/1978 | United Kingdom | 427/1 |

OTHER PUBLICATIONS

Sharp, D. W. A. et al., J. Chem. Soc., Part II, pp. 1855-1858 (1956).
C.A., vol. 63, 9729d (1965).
C.A., vol. 48, 13520d (1954).
C.A., vol. 61, 6894g (1964).
C.A., vol. 48, 5704i (1954).
C.A., vol. 53, 6866a (1959).
C.A., vol. 48, 3080i (1954).

*Primary Examiner*—Teddy S. Gron
*Attorney, Agent, or Firm*—Alan A. Thomson

[57] ABSTRACT

Latent fingerprints can be detected and visualized by application to the suspected locale, of a solution, in a volatile organic solvent of selected silver salts soluble in said solvent. Suitable salts include silver perchlorate and silver trifluoroacetate. The solution is preferably applied as a spray. This non-aqueous solution minimizes smudging, "running", warping and other damage to water-sensitive material (usually inks, dyes and/or cellulosic substrates).

11 Claims, No Drawings

LATENT FINGERPRINT DETECTION

This invention is directed to the detection of, and visualization of latent fingerprints on various substrates particularly substrates which are susceptible to damage by aqueous systems. A non-aqueous organic solution is provided containing silver ions which are able to react with and become preferentially deposited on, the fingerprint residual material. The solution is adapted to be sprayed onto the suspected substrate or fingerprint locale with a propellant or by other suitable spray means.

DESCRIPTION OF PRIOR ART

Current techniques for fingerprint detection utilize reagents which interact with one or more of the components in the fingerprint. The most commonly utilized print components and reagents (especially for cellulosic substrates) are:

(i) Amino-acid-sensitive reagents, particularly ninhydrin in various carriers. Some substrates such as coated papers (banknotes, documents etc.), rag-based papers, and some textiles are ninhydrin-positive, giving a background reaction and inadequate contrast in many cases. Depending on the carrier and the substrate, other limitations can be: low sensitivity, uncontrollable development time, ink- or dye-"running", and high flammability.

(ii) Chloride-sensitive reagents, particularly aqueous silver nitrate solutions. This reagent reacts with the chlorides present in fingerprints to produce the highly insoluble and light-sensitive silver chloride. The white silver chloride decomposes actinically to deposit silver and give a black image of the latent print. Defects of this reagent include severe ink-"running", and high background reaction in some cases, leading to overall darkening of the whole substrate area. (iii) Fat-sensitive reagents, primarily iodine vapour or the recently reported osmium tetroxide (see RCMP Gazette, Vol. 40, No. 3, 1978, page 28). An iodine source, e.g., iodine fuming pipe or iodine-saturated silica gel or iodine-loaded porous glass, is used to expose the latent print area to iodine vapour and usually a silver plate is then pressed against the surface containing the iodine-saturated print residue, the exposed plate then being developed to reveal the image. These methods have some manipulative and toxicity difficulties so that precautions and careful handling are required.

It would be desirable to have improved print-sensitive reagents which avoid at least some of the above difficulties. An improved chloride-sensitive reagent which avoids the ink-"running" problem and has minimal background reaction would be particularly desirable.

SUMMARY OF THE INVENTION

We have developed a chloride-sensitive non-aqueous solution suitable for application to latent fingerprints for detection and visualization thereof, comprising
(a) a volatile organic solvent, and
(b) a silver salt soluble in solvent (a), sufficient silver ions being present to visualize a latent print in one spray application.

The invention includes a method for detection and visualization of latent fingerprints where the use of aqueous media is detrimental, comprising (i) uniformly contacting the latent print area with a non-aqueous solution comprising (a) a volatile organic solvent, and
(b) a silver salt soluble in said solvent, sufficient silver ions being present to visualize a latent print, (ii) evaporating the solvent, allowing reaction of silver ion with fingerprint material to proceed and photoactinic effects to occur leading to visualization of the fingerprint, and (iii) preserving or recording the fingerprint outline.

The components may be packaged separately as a kit comprising
(a) organic solvent-soluble silver salt,
(b) volatile organic solvent for the salt; and
(c) means to spray or propel the solution onto a substrate.

DETAILED DESCRIPTION

The volatile organic solvent serving as carrier for the silver ions, is chosen for its ability to dissolve silver salts, to readily evaporate, relative inertness with respect to inks, dyes and cellulosic substrates, and low toxicity and flammability. The hydrocarbon solvents, or hydrocarbon components in the case of solvent mixtures, will necessarily have unsaturation present. Volatile organic solvents which have been found to be the most suitable for our purpose include aromatics such as benzene, and unsaturated aliphatics such as 1-hexene. They dissolve the selected silver salts to a substantial concentration (saturation is usually about 4 to 6%) and do not seriously "run" or smear most inks or dyes nor distort most cellulosic substrates. Appropriate organic solvents include benzene, toluene, xylene or mixed xylenes, 1-hexene, and mixtures of methanol or ethanol with unsaturated aliphatics such as cyclohexene (stabilized with sodium hydroxide as supplied commercially). In the latter mixture, about 5 to about 50% by vol. would be the cyclohexene or equivalent. This latter mixture is not to be used with silver perchlorate but may be used, e.g. with the fluoro salts. The toxicity and flammability of these solvents is acceptably low. The alcohol-containing solvent is preferred for low toxicity; however it can lead to some smearing of ballpoint pen inks. Cyclohexene alone and 1-hexene are next in order of preference for toxicity. Water-base inks and ballpoint inks are both stable to these solvents. Another solvent which may be used is acetonitrile although this has increased smell and toxicity. Some unsaturation in at least one component of a hydrocarbon-containing solvent has been found necessary. Mixtures of solvents can be used.

The selected silver salts are limited primarily by solubility, but stability, cost, availability, safety and other factors enter in. The silver salts most suitable include silver perchlorate, and fluoro salts such as silver hexafluorophosphate, silver hexafluoroantimonate, silver tetrafluoroborate and silver trifluoroacetate. In general, any silver salt soluble in organic solvents to at least about 0.5% by weight would be operative. Mixtures of two or more of these salts can be used.

The concentration of silver salt in the organic solvent can range from about 0.5% by weight up to saturation. Desirably sufficient silver salt is present in the solution so that one spray application will deposit enough silver to visualize the print. From about 1 to 3% by weight is usually suitable, preferably about 3%. These solutions are reasonably stable and have been stored for up to 3 months or more without significant deterioration. The solutions should not be stored in contact with most metals since many metals can lead to deterioration by deposition of silver.

These organic solutions are coated on the fingerprint substrate or suspected locale in any convenient manner—usually by spraying. Mechanical spray means can be used or the solution can be contained under pressure with a propellant. Any of the standard propellants may be used such as compressed air, fluorinated or chloro-fluoro-hydrocarbons (e.g. a Freon (trademark) type), $CO_2$ gas, nitrous oxide or $N_2$ gas, or a highly volatile hydrocarbon (methane to butane). The latter are flammable and their use requires caution. Aerosol spray containers may be used as long as any metal is coated or not in direct contact with the solution.

A packaged unit or kit can be provided for convenience, comprising interacting components
(a) the organic solvent-soluble silver salt,
(b) the volatile organic solvent for (a) and
(c) means to spray or propel the solution.

The substrates for which these silver salt-organic solvent solutions are particularly suitable include paper and other cellulosics, some textiles and water-sensitive materials or coatings in general.

The application of heat speeds up the reaction of silver with the print composition and additional light a accelerates the decomposition and deposition of silver—leading to more rapid development rates if desired. However, room temperatures and normal room light or outdoor daylight are adequate in most cases.

The developed print of the fingerprint is usually recorded photographically and the film stored.

The following Examples are illustrative.

EXAMPLE 1

Pure white relatively porous bond paper containing fountain pen writing was used as the substrate. A 3% silver perchlorate in toluene solution was sprayed on the paper and time allowed for solvent evaporation, reaction and development at room temperature in normal room light. The fountain pen writing was unchanged. Several fingerprints were seen to show up clearly with good contrast.

When the same paper with fountain pen writing was sprayed with standard aqueous silver nitrate, the writing became smeared and blurred with parts of the writing becoming illegible.

EXAMPLE 2

Bank cheques on special safety paper and having three written signatures thereon were tested using the same sprays as in Example 1. With the toluene-silver perchlorate spray the cheques were substantially unaltered. However, with aqueous silver nitrate spray the signatures and written dates became very blurred and there was some evidence of ink migration to other parts of the cheques. With the toluene-based spray fingerprints could be readily visualized without interference from migrated ink.

EXAMPLE 3

American Express travellers' cheques were tested as substrates using the same sprays as in Example 1. With the toluene-based spray there was only very slight damage (signatures and dates still legible but slight ink migration). However, with the aqueous spray the written signatures became substantially illegible with extensive ink migration occurring. This ink migration was serious enough to make fingerprint detection in the vicinity of the writing very difficult.

As well as the above toluene-based spray other salt-solvent combinations have given good results as summarized in Table 1.

TABLE 1
SUMMARY OF FINGERPRINT RESULTS USING VARIOUS SILVER SALTS AND VARIOUS VOLATILE ORGANIC SOLVENTS[a]

| | SILVER SALTS | ORGANIC SOLVENT | TOXICITY OF SOLVENT | OTHER COMMENTS |
|---|---|---|---|---|
| 1. | Silver Perchlorate $AgClO_4$ | Benzene | High | b |
| 2. | Silver Perchlorate $AgClO_4$ | Toluene | Moderate | b |
| 3. | Silver Perchlorate $AgClO_4$ | Xylene or Mixed Xylenes | " | b |
| 4. | Silver Perchlorate $AgClO_4$ | 1-Hexene | " | b |
| 5. | Silver Nitrate $AgNO_3$ | Cyclohexene-Alkanol[e] | " | c |
| 6. | Silver Tetrafluoroborate $AgBF_4$ | Benzene | High | b |
| 7. | Silver Tetrafluoroborate $AgBF_4$ | Toluene and Xylenes | Moderate | b |
| 8. | Silver Nitrate $AgNO_3$ | Acetonitrile | High | c,d |
| 9. | Silver Hexafluoroantimonate $AgSbF_6$ | Acetonitrile | " | c,d |

[a] Concentration of solution is 3% by weight unless otherwise indicated.
b No smearing of ballpoint ink; no distortion of paper
c Smearing of ballpoint inks less severe than with aqueous sprays
d Concentration less than 1% by weight due to limited solubility
e 5–50% by volume of cyclohexene with methanol or ethanol

We claim:

1. A method for detection and visualization of latent fingerprints where the use of aqueous media is detrimental, comprising
   (i) uniformly contacting the latent print area of the substrate with a non-aqueous solution comprising
   (a) a volatile organic solvent with unsaturation present, and
   (b) a silver salt soluble in said solvent, sufficient silver ions being present to visualize a latent print, the silver salt being selected from silver perchlorate, silver hexafluoroantimonate, silver hexafluorophosphate, silver tetrafluoroborate, silver trifluoroacetate, and mixtures thereof;
   (ii) evaporating the solvent, allowing reaction of silver ion with fingerprint material to proceed and photo-actinic effects to occur leading to visualization of the fingerprint, and
   (iii) preserving or recording the fingerprint outline.

2. The method of claim 1 wherein the solution is sprayed over the entire latent print area.

3. The method of claim 1 wherein the solvent is selected from benzene, toluene, xylene, mixed xylenes, 1-hexene, cyclohexene, and mixtures thereof.

4. The method of claim 1 wherein the fingerprint outline is recorded photographically.

5. The method of claim 1 wherein the solvent is toluene, the salt is silver perchlorate and the salt concentration 1–3%

6. A kit for the detection and visualization of latent fingerprints comprising
   (a) a silver salt selected from silver perchlorate, silver hexafluoroantimonate, silver hexafluorophosphate, silver tetrafluoroborate, silver trifluoroacetate and mixtures thereof,
   (b) volatile unsaturated organic solvent for (a), and (c) mechanical means to spray or propel the solution of (a) plus (b) onto a substrate.

7. The kit of claim 6 wherein the salt and solvent are packaged in the form of a solution.

8. A non-aqueous solution suitable for application to latent fingerprints for detection and visualization thereof, comprising:
   (a) a volatile solvent mixture of an alkanol selected from methanol or ethanol, and from about 5 to about 50% by volume of the mixture of cyclohexane; and
   (b) a silver salt selected from the group consisting of silver hexafluorophosphate, silver hexafluoroantimonate, silver tetrafluoroborate, silver trifluoroacetate and silver nitrate; the silver salt being present in from about 1 to about 3% by wt.

9. A sprayable non-aqueous solution dispersed in an aerosol propellant under pressure, the solution being suitable for application to latent fingerprints for detection and visualization thereof, said solution comprising:
   (a) a volatile organic solvent with unsaturation present; and
   (b) a silver salt soluble in solvent (a) and selected from the group consisting of silver perchlorate, silver hexafluorophosphate, silver hexafluoroantimonate, silver tetrafluoroborate, silver trifluoroacetate and mixtures thereof.

10. The solution-propellant combination of claim 9 wherein the propellant is selected from volatile halogenated hydrocarbons, inert gases, and highly volatile hydrocarbons.

11. The solution-propellant combination of claim 9 wherein the volatile organic solvent is selected from benzene, toluene, xylenes, cyclohexene, and 1-hexene.

* * * * *